United States Patent
Bauerle et al.

(10) Patent No.: US 7,092,810 B2
(45) Date of Patent: Aug. 15, 2006

(54) METHOD AND SYSTEM FOR REDUCING ACCELERATION-BASED WHEEL SLIP UTILIZING PEDAL-TO-THROTTLE PROGRESSION TABLES

(75) Inventors: Paul A. Bauerle, Fenton, MI (US); James L. Worthing, Munith, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/268,828

(22) Filed: Oct. 10, 2002

(65) Prior Publication Data

US 2004/0073352 A1 Apr. 15, 2004

(51) Int. Cl.
*G06F 17/00* (2006.01)

(52) U.S. Cl. .......................... 701/85; 701/82; 180/197

(58) Field of Classification Search .................. 701/82, 701/84, 85, 90, 92, 110; 180/197
See application file for complete search history.

(56) References Cited

U.S. PATENT DOCUMENTS

| | | | |
|---|---|---|---|
| 4,811,808 A * | 3/1989 | Matsumoto et al. | 180/197 |
| 5,400,865 A * | 3/1995 | Togai et al. | 180/197 |
| 6,334,500 B1 * | 1/2002 | Shin | 180/197 |
| 6,347,680 B1 * | 2/2002 | Mianzo et al. | 180/197 |
| 6,442,472 B1 * | 8/2002 | Vivek et al. | 701/110 |

* cited by examiner

*Primary Examiner*—Michael J. Zanelli
(74) *Attorney, Agent, or Firm*—Christopher DeVries

(57) ABSTRACT

A system and method is directed to wheel slip for a mobile vehicle. The method provides for monitoring a plurality of vehicle system signal inputs, determining an actual vehicle speed value, a pedal progression vehicle speed value, and a control signal modification value based on the vehicle system signal inputs. The method further provides for determining a control signal value based on the control signal modification value and controlling pedal progression input based on the determined control signal value. The system includes determining an actual vehicle speed value, a pedal progression vehicle speed value, and a control signal modification value based on a plurality of vehicle system signal inputs. The system further determines a control signal value based on the control signal modification value and controls a pedal progression input based on the determined control signal value are also provided.

20 Claims, 2 Drawing Sheets

METHOD AND SYSTEM FOR REDUCING ACCELERATION-BASED WHEEL SLIP UTILIZING PEDAL-TO-THROTTLE PROGRESSION TABLES

TECHNICAL FIELD

In general, the invention relates to traction control of a mobile vehicle. More specifically, the invention relates to a method and system for reducing acceleration-based wheel slip utilizing pedal-to-throttle progression tables.

BACKGROUND OF THE INVENTION

Internal combustion engines include, among many others, systems for traction control. Such control impacts important aspects of vehicle operation, paramount among which is safety. There are many types of traction control systems utilized throughout the industry and implemented in various manners. For example, mechanical systems include limited slip differential systems, multi-wheel drive systems, and the like. Unfortunately, some low-end models of mobile vehicles preclude the use of the mechanical systems due to baseline costs associated with materials, labor, etc.

Recently, there has been movement in the industry toward assisting or replacing the mechanical systems with electrical/electronic control systems. Many of the electrical/electronic systems require numerous sensing devices, additional hardware for processing data from the sensing devices, and may also require additional parts to implement the system commands. Unfortunately, due to the electrical/electronic systems recent development, including such systems in low-end models, may be cost prohibitive.

It would be desirable, therefore, to provide a method and system that would overcome these and other disadvantages.

SUMMARY OF THE INVENTION

The present invention is directed to a system and method for controlling wheel slip for a mobile vehicle. The invention provides for conditioning of signal input data utilized by a database that supplies a throttle control signal.

One aspect of the invention provides a method for controlling acceleration-based wheel slip within a mobile vehicle by monitoring a plurality of vehicle system signal inputs, determining an actual vehicle speed value based on the vehicle system signal inputs, determining a pedal progression vehicle speed value based on the vehicle system signal inputs, determining a control signal modification value based on the vehicle system signal inputs, determining a control signal value based on the control signal modification value, and controlling pedal progression input based on the determined control signal value.

In accordance with another aspect of the invention, a system for controlling acceleration-based wheel slip within a mobile vehicle is provided. The system includes means for determining an actual vehicle speed value based on a plurality of vehicle system signal inputs. The system further includes means for determining a pedal progression vehicle speed value based on the vehicle system signal inputs. Means for determining a control signal modification value based on the vehicle system signal inputs is also provided. The system further includes means for determining a control signal value based on the control signal modification value, and means for controlling pedal progression input based on the determined control signal value.

In accordance with yet another aspect of the invention, a computer readable medium storing a computer program includes: computer readable code for receiving a plurality of vehicle system signal inputs; computer readable code for determining an actual vehicle speed value based on the vehicle system signal inputs; computer readable code for determining a pedal progression vehicle speed value based on the vehicle system signal inputs; computer readable code for determining a control signal modification value based on the vehicle system signal inputs; computer readable code for determining a control signal value based on the control signal modification value; and computer readable code for controlling pedal progression input based on the determined control signal value.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Throughout the specification, and in the claims, the term "connected" means a direct electrical connection between the things that are connected, without any intermediate devices. The term "coupled" means either a direct electrical connection between the things that are connected, or an indirect connection through one or more passive or active intermediary devices. The term "circuit" means either a single component or a multiplicity of components, either active or passive, that are coupled together to provide a desired function.

The present invention relates to traction control of a mobile vehicle and more particularly to a method and system for reducing acceleration-based wheel slip utilizing pedal-to-throttle progression tables. The invention provides for a throttle control system that accommodates wheel slip presented by a mobile vehicle. It is a goal of the invention to expand the authority of vehicle speed-based throttle progressions to meet drivability metrics without exceeding acceptable increases in the throttle that may result in startling a driver. The present invention seeks to determine and select a rate limit that is aggressive enough to not startle the driver, when vehicle speed becomes noisy or slip occurs, by limiting the vehicle speed axis.

Illustrative Operating Environment

Figure 1:
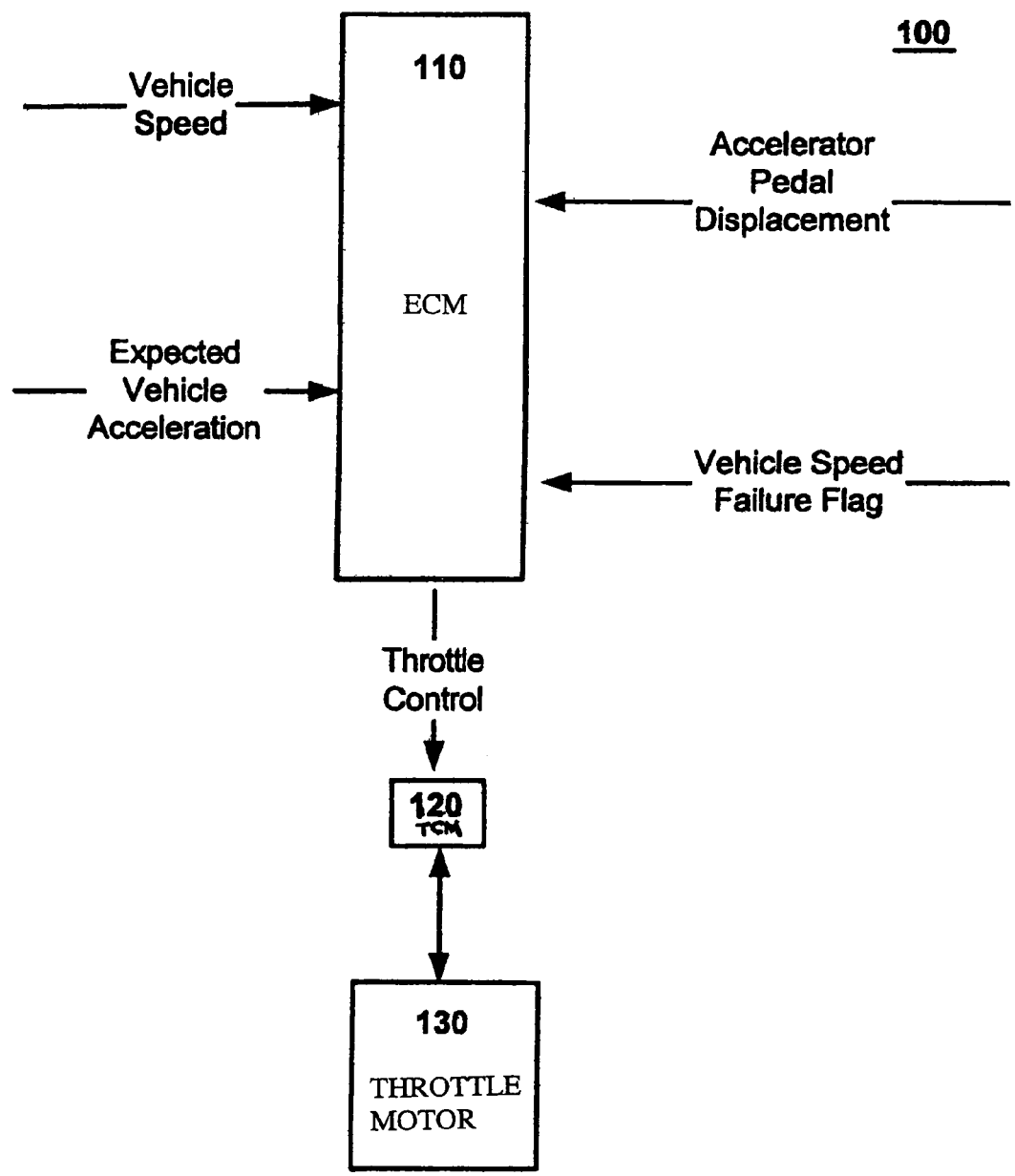
FIG. 1 is a block diagram illustrating an operating environment according to an embodiment of the present invention.

FIG. 1 is a block diagram illustrating an example of an operating environment that is in accordance with the present invention. FIG. 1 details an embodiment of a system for operating a traction control system, in accordance with the present invention, and may be referred to as a mobile vehicle traction control system 100. The mobile vehicle traction control system 100 includes an engine control module (ECM) 110, a throttle control module (TCM) 120, and a throttle control motor 130. TCM 120 further includes a throttle control signal input and a throttle motor control signal output.

Engine control module (ECM) 110 is coupled to TCM 120. TCM 120 is further coupled to throttle control motor 130. ECM 110 further includes one or more vehicle system signal inputs (VSSIs). In one embodiment, VSSIs include vehicle speed signal inputs, an expected vehicle acceleration signal input, an accelerator pedal displacement signal input, a vehicle speed failure flag signal input, and a throttle control signal output. Additionally, ECM 110 further includes an output providing a throttle control signal.

In an example, the vehicle speed signal input is implemented as a transmission output speed sensor input. In another example, the vehicle speed signal input is implemented as a wheel output speed sensor input. In yet another example, the vehicle speed signal input is implemented as a signal based on engine speed and speed ratio, such as a specific gear ratio. In yet another example, the vehicle speed signal input is implemented as a global positioning speed sensor input. In still another example, the vehicle speed signal input is implemented as a combination of one or more of the aforementioned vehicle speed signal inputs.

In a further example, the expected vehicle acceleration signal input is a system-determined quantity derived from an axle torque sensor signal input. In another example, the expected vehicle acceleration signal input is a system determined quantity derived from a vehicle speed sensor signal input. In yet another example, the expected vehicle acceleration signal input is a system determined quantity derived from a modified vehicle mass. In another example, the expected vehicle acceleration signal input is a system determined quantity derived from global positioning data. In still another example, the expected vehicle acceleration signal input is a system determined quantity derived from one or more of the aforementioned vehicle acceleration signal inputs.

In another example, the accelerator pedal signal input is implemented as a system determined signal. In yet another example, the vehicle speed failure input is implemented as a system determined signal.

Engine control module (ECM) 110 is a control device designed to monitor and receive data from various sources, process the received data, and transmit a control signal. In one embodiment, ECM 110 includes hardware and software necessary to implement throttle control via a throttle control device, as known in the art. In another embodiment, ECM 110 includes hardware and software necessary to implement throttle control via electronic throttle control (ETC). In an example, ECM 110 is implemented as a central processing unit (CPU) including accompanying devices, such as PROMS, and software programming enabling the CPU to conduct operations.

In another embodiment, ECM 110 includes a database having a matrix defining a value for every combination of accelerator pedal signal, throttle area, and control signal modification values. The throttle area value and the control signal modification value are system determined values defined in FIG. 2 below. In an example, the database is implemented as a lookup table, as known in the art.

Throttle control module (TCM) 120 is a control device designed to monitor and receive data from one or more sources, process the received data, and transmit a control signal. In one embodiment, TCM 120 includes hardware and software necessary to implement throttle control via a throttle control motor, as known in the art. In an example, TCM 120 is implemented as a central processing unit (CPU) including accompanying devices, such as PROMS, and software programming enabling the CPU to conduct operations.

In another embodiment, TCM 120 hardware and software are located within, but separate from, standard ECM 110 components. In yet another embodiment, the functions TCM 120 performs are included within the hardware components and software included within ECM 110. In another embodiment, TCM 120 utilizes portions of ECM 110 hardware in conjunction with hardware and software specific to TCM 120 to perform required tasks.

In operation, TCM 120 receives the throttle control signal from ECM 110, monitors and receives position feedback from throttle control motor 130, determines a motor control signal based on the received signal data, and transmits a control signal to throttle control motor 130.

Throttle control motor 130 is a motorized control device designed to receive and implement control signal data, and provide feedback to TCM 120. In one embodiment, throttle control motor 130 receives control signal data from TCM 120, determines throttle plate position data based on the received data, implements the throttle plate position data, and transmits the throttle plate position data in the form of a feedback signal to TCM 120.

In operation and detailed in FIG. 2 below, ECM 110 receives signal inputs and generates a control signal output. The TCM 120 receives the throttle control signal and implements control of throttle control motor 130.

Exemplary Throttle Control

Figure 2:
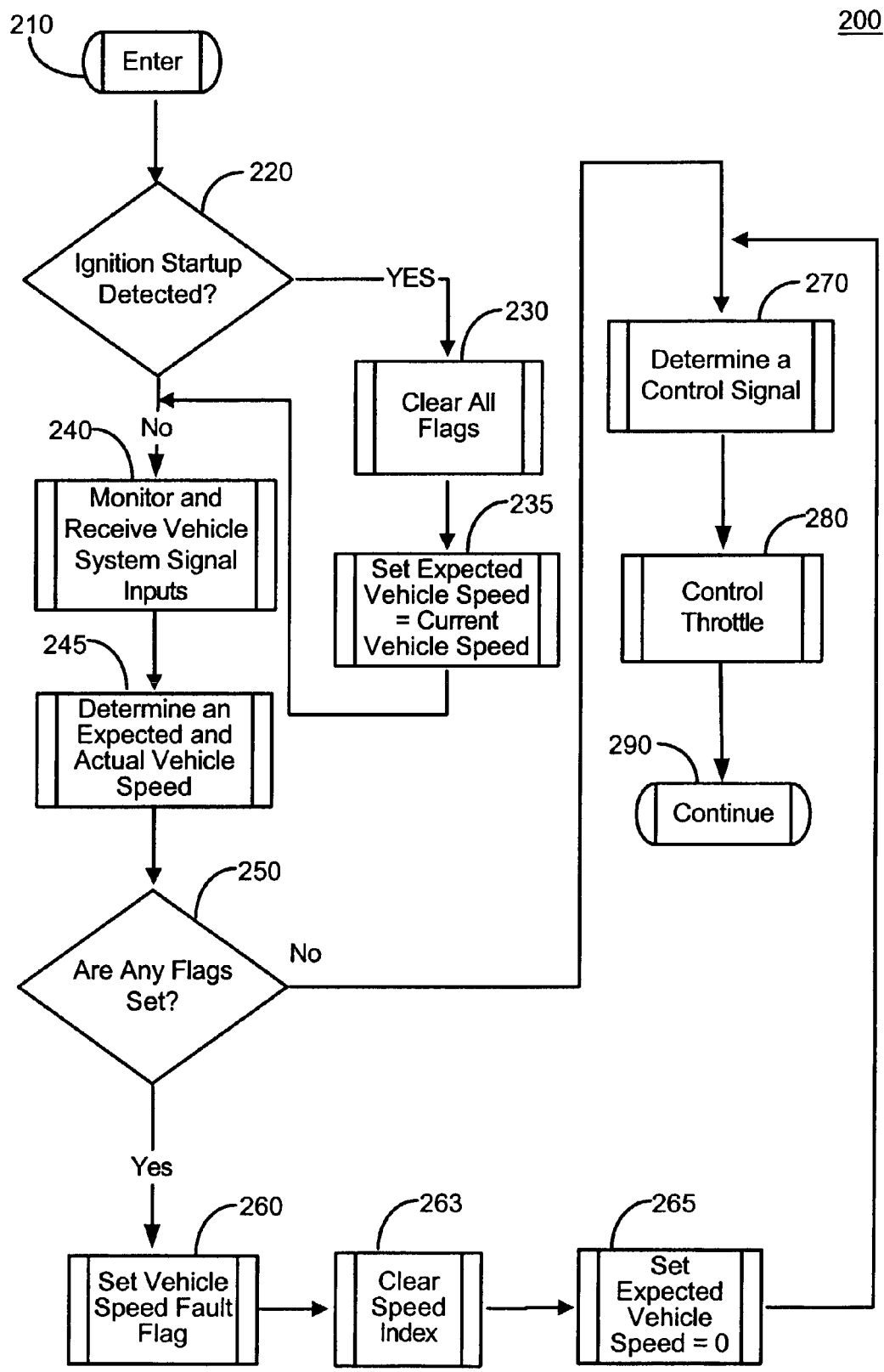
FIG. 2 is a flow diagram depicting an exemplary embodiment of code on a computer readable medium in accordance with the present invention.

FIG. 2 is a flow diagram depicting an exemplary embodiment of code on a computer readable medium in accordance with the present invention. FIG. 2 details an embodiment of a method 200 for operating a throttle control system, in accordance with the present invention. Method 200 may utilize one or more systems/devices detailed in FIG. 1 above.

Method 200 begins at block 210 where it is determined that a throttle control system adjustment is required. For example, it is desirable to maintain as much of a requested throttle increase as possible while also maintaining wheel traction without startling a mobile vehicle user. Many low end vehicle models do not posses traction control at all, due to cost concerns, and some vehicles reduce traction control when in four wheel drive (4WD) mode. Therefore, it is desirable to implement conditioning of pedal progression signals in order to minimize vehicle speed increases that would result in wheel slippage. The method then advances to decision block 220.

At decision block 220, method 200 determines if ignition startup is detected. If ignition startup is detected the method advances to block 230. If ignition startup is not detected the method advances to block 240.

At block 230, method 200 clears flags associated with the throttle control system due to ignition startup. Flags are cleared at ignition startup to remove potentially corrupted data from data stream. In one embodiment, flags associated with the throttle control system include data received from vehicle system signal inputs (VSSIs) as described in FIG. 1 above. In another embodiment, flags associated with the throttle control system include internal flags set based on data received from VSSIs as described in FIG. 1 above. The method then advances to block 235.

At block 235, method 200 sets expected vehicle speed value equal to current vehicle speed value. The expected vehicle speed value has not been calculated utilizing acceptable data at startup. In one embodiment, the expected vehicle speed value is set equal to the current vehicle speed value at startup. In another embodiment, the expected vehicle speed value is set equal to the lesser current vehicle speed value if multiple current vehicle speed values are available at startup. The method then advances to block 240.

At block 240, method 200 monitors and receives vehicle system signal inputs (VSSIs). Method 200 monitors VSSIs utilizing engine control module (ECM) 110 wherein ECM 110 monitors and receives the VSSIs as detailed and described in FIG. 1 above. The VSSIs include signal input data indicating vehicle speed, expected vehicle acceleration, accelerator pedal displacement, vehicle speed failure flag settings, and the like. The method then advances to block 245.

At block 245, method 200 determines an expected vehicle speed value and an actual speed value based on the VSSIs received in block 240 above. In one embodiment and referring to FIG. 1 above, the actual speed value is determined from one or more received vehicle speed signal inputs. In an example, a single vehicle speed input is received with its value assigned as the actual speed value. In another example, multiple vehicle speed inputs are received with the lowest vehicle speed input value being assigned as the actual speed value.

In another embodiment and again referring to FIG. 1 above, the expected vehicle speed value is determined utilizing an expected vehicle acceleration signal input, a loop rate value, and a placeholder value, where the placeholder value is assigned as a previous pedal progression vehicle speed value discussed in block 270 below. In one example, the expected vehicle speed value is calculated as the summation of the placeholder value and the product of the signal input and the loop rate. In this way, the pedal progression vehicle speed value is rated limited. The method then advances to decision block 250.

At decision block 250, method 200 determines if flags associated with the throttle control system are set. Electronic throttle control (ETC) progressions are a function of pedal position and either engine speed or vehicle speed if the speed signal is valid. If the speed signal is failed, a speed of 0.0 is used, effectively making the progressions a function of pedal position only. The vehicle speed contribution is minimal.

In one embodiment, flags associated with the throttle control system include data received from vehicle system signal inputs (VSSIs) as described in FIG. 1 above. In another embodiment, flags associated with the throttle control system include internal flags based on data received from VSSIs as described in FIG. 1 above. If there are flags set, the method advances to block 260. If there are not flags set, the method advances to block 270.

At block 260, method 200 sets an internal flag if the internal flag has not previously been set. The internal flag is utilized due to an external flag's potential subjectivity to changes in status, relating from dynamic conditions, allowing method 200 to maintain a specified operational status. In one embodiment, an internal flag is utilized to indicate that a portion of data received is potentially corrupted and the data is to be disregarded. In this embodiment, data will continue to be disregarded until all flags have been cleared. The method then advances to block 263.

At block 263, method 200 clears a speed index, also referred to as a control signal modification value, resulting in the speed index having a value of 0.0. The method then advances to block 265. At block 265, method 200 sets the expected vehicle speed value equal to 0.0. The method then advances to block 270.

At block 270, method 200 determines a control signal based on the VSSIs, the determined actual vehicle speed and expected vehicle speed values, and a database identifier. In one embodiment, the actual vehicle speed value is the value determined in block 245 above. In another embodiment, the expected vehicle speed value is the value determined in block 245 above. In yet another embodiment, the expected vehicle speed value is the value determined in block 265 above. In one example, the expected vehicle speed value of block 265 is utilized due to the setting of one or more flags resulting from potentially corrupted data within the system.

The control signal value determination is based on the VSSI values, the database utilized, and determining the control signal modification value. Determining the control signal modification value includes determining a pedal progression vehicle speed value, described below, and further determining if flags associated with the throttle control system are set, as described in blocks 250 and 260–263 above. The pedal progression vehicle speed value is based on the determined actual vehicle speed and expected vehicle speed values described above.

In an example, determination of the pedal progression vehicle speed value is expressed as follows:

$$\text{Vehicle\_Speed\_For\_Pedal\_Prog} = \text{MIN}(\text{Vehicle\_Speed}, \text{Expected\_Vehicle\_Speed})$$

where the Vehicle_Speed is the actual vehicle speed value. In this example, the actual vehicle speed and the expected vehicle speed values are determined in block 245 above. In the situation of a set flag, as described in decision block 250 above, the expected vehicle speed value is determined in block 265 above.

In another example, determination of the pedal progression vehicle speed value is expressed as follows:

$$\text{Vehicle\_Speed\_For\_Pedal\_Prog} = \text{MIN}(\text{MIN}(\text{Vehicle\_Speed\_1}, \text{Vehicle\_Speed\_2}),$$
$$(\text{Expected\_Acceleration} * \text{Loop\_Rate} + \text{Vehicle\_Speed\_For\_Pedal\_Progression}))$$

In this example, the details of block 245 are included for clarification, and the loop rate is a predetermined value assigned as, for example, 50 ms.

The control signal modification value is then set equal to the pedal progression vehicle speed value if all flags associated with the throttle control system are clear. If any flags associated with the throttle control system are set, then the control signal modification value, also referred to as the clear speed index and described above in block 263, is set to 0.0. The database identifier value is a predetermined value identifying a specific database where the control signal values are stored.

The control signal value determination further utilizes the accelerator pedal signal input value from the vehicle system signal inputs (VSSIs). In one embodiment, the control signal value determination includes a database with a defined value for every combination of accelerator pedal signal input value, control signal modification value, and database identifier value. In an example, the database is implemented as a lookup table.

In another example, determination of the control signal value is expressed as follows:

```
IF (Engine_Speed_Based_Prog_Selected = = TRUE)
  Speed_Index = Engine_Speed
ELSEIF ((Primary_Vehicle_Speed_Sensor_Failed = False) &&
```

-continued

```
(VehSpeedFltThisKeyOn = False))
VehSpeedForPedalProg = MIN ((Vehicle_Speed),
MAX(Ke_MinExpctdAcceltn, Veh_Acceltn_Expected) * 4 *
CfETCS_1_PeriodicA + VehSpeedForPedalProg))
Speed_Index = VehSpeedForPedalProg
ELSE
Speed_Index = 0.0
VehSpeedFltThisKeyOn = TRUE
ENDIF
Throt_Area_Pedal_Psm = LOOKUP-
PROTECTED3D(KtETCS_Pct_ThrotAreaPedalPerfmAx,
Accel_Pedal_Pstn_ETC, Speed_Index)
``` where Primary_Vehicle_Speed_Sensor_Failed is a flag associated with data received from vehicle system signal inputs (VSSIs) as described in FIG. 1 and block 250 of FIG. 2 above. VehSpeedFltThisKeyOn is an internal flag set based on data received from VSSIs as described in FIG. 1 and block 250 of FIG. 2 above. Ke is a constant having a value chosen so that the constant enhances the pedal progression value, so that the pedal progression value maintains a dynamic value. CfETCS_1_PeriodicA is a value representing a specified loop rate and multiplied by four (4) to achieve a term in kph.

The method then advances to block 280. At block 280 and referring to FIG. 1, method 200 transmits a control signal to throttle control motor 130 based on the control signal value determined above in block 270. Method 200 then advances to block 290, where it returns to standard programming.

The above-described methods and implementation for throttle control of a mobile vehicle are example methods and implementations. These methods and implementations illustrate one possible approach for reducing acceleration based wheel slip utilizing pedal to throttle progression tables. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

The invention claimed is:

1. A method for controlling acceleration based wheel slip within a mobile vehicle, the method comprising:
    monitoring a plurality of vehicle system signal inputs;
    determining an actual vehicle speed value based on the vehicle system signal inputs;
    determining a pedal progression vehicle speed value based on the vehicle system signal inputs;
    determining a control signal modification value based on the pedal progression vehicle speed value;
    determining a control signal value based on the control signal modification value; and
    controlling a throttle based on the determined control signal value.

2. The method of claim 1 wherein the vehicle system signal inputs are selected from a group consisting of: at least one vehicle speed signal input, an accelerator pedal signal input, an expected vehicle acceleration signal input; and a vehicle speed failure input.

3. The method of claim 2 wherein the at least one vehicle speed signal input is selected from a group consisting of: a transmission output speed sensor, a wheel output speed sensor, a signal based on engine speed and speed ratio, and a global positioning speed sensor.

4. The method of claim 2 wherein the expected vehicle acceleration signal input is a system derived quantity resulting from vehicle information selected from a group consisting of: axle torque, vehicle speed, modified vehicle mass, and global positioning data.

5. The method of claim 1 wherein determining the actual vehicle speed value comprises:
    receiving at least one vehicle speed signal input, each vehicle speed signal input including an associated vehicle speed signal value, within the vehicle system signal inputs;
    comparing vehicle speed signal input values when there are more than one vehicle speed signal inputs; and
    assigning the lesser of the received vehicle speed input values to the actual vehicle speed value.

6. The method of claim 1 wherein determining the pedal progression vehicle speed value comprises:
    determining a placeholder vehicle speed value;
    determining an expected vehicle speed value based on the placeholder vehicle speed value;
    comparing the expected vehicle speed value to the actual vehicle speed value; and
    assigning the lesser of the expected vehicle speed value and the actual vehicle speed value to the pedal progression vehicle speed value.

7. The method of claim 6 wherein the placeholder vehicle speed value is based on a previous pedal progression vehicle speed value.

8. The method of claim 1 wherein determining the control signal modification value comprises:
    receiving a vehicle speed failure input value based on the vehicle system signal inputs;
    assigning the pedal progression vehicle speed value to the control signal modification value when the vehicle speed failure input value is false; and
    assigning a value of 0.0 to the control signal modification value when the vehicle speed failure input value is true.

9. The method of claim 1 wherein determining the control signal value comprises:
    determining a database based on a database identifier value;
    comparing the control signal modification value and an accelerator pedal signal input value to the database; and
    determining the control signal value based on the comparison.

10. The method of claim 9 wherein the database comprises a lookup table comprising a control signal value for each combination of control signal modification and accelerator pedal signal input values.

11. A computer readable medium storing a computer program comprising:
    computer readable code for receiving a plurality of vehicle system signal inputs;
    computer readable code for determining an actual vehicle speed value based on the vehicle system signal inputs;
    computer readable code for determining a pedal progression vehicle speed value based on the vehicle system signal inputs;
    computer readable code for determining a control signal modification value based on pedal progression vehicle speed value;
    computer readable code for determining a control signal value based on the control signal modification value; and computer readable code for controlling a throttle based on the determined control signal value.

12. The computer readable medium of claim 11 wherein the vehicle system signal inputs are selected from a group consisting of: at least one vehicle speed signal input, an accelerator pedal signal input, an expected vehicle acceleration signal input; and a vehicle speed failure input.

13. The computer readable medium of claim 12 wherein the at least one vehicle speed signal input is selected from a group consisting of: a transmission output speed sensor, a wheel output speed sensor, a signal based on engine speed and speed ratio, and a global positioning speed sensor.

14. The computer readable medium of claim 12 wherein the expected vehicle acceleration signal input is a system derived quantity resulting from vehicle information selected from a group consisting of: axle torque, vehicle speed, modified vehicle mass, and global positioning data.

15. The computer readable medium of claim 11 wherein determining the actual vehicle speed value comprises:
   computer readable code for receiving at least one vehicle speed signal input, each vehicle speed signal input including an associated vehicle speed signal value, within the vehicle system signal inputs;
   computer readable code for comparing vehicle speed signal input values when there are more than one vehicle speed signal inputs; and
   computer readable code for assigning the lesser of the received vehicle speed input values to the actual vehicle speed value.

16. The computer readable medium of claim 11 wherein determining the pedal progression vehicle speed value comprises:
   computer readable code for determining a placeholder vehicle speed value;
   computer readable code for determining an expected vehicle speed value based on the placeholder vehicle speed value;
   computer readable code for comparing the expected vehicle speed value to the actual vehicle speed value; and
   computer readable code for assigning the lesser of the expected vehicle speed value and the actual vehicle speed value to the pedal progression vehicle speed value.

17. The computer readable medium of claim 16 wherein the placeholder vehicle speed value is based on a previous pedal progression vehicle speed value.

18. The computer readable medium of claim 11 wherein determining the control signal modification value comprises:
   computer readable code for receiving a vehicle speed failure input value based on the vehicle system signal inputs;
   computer readable code for assigning the pedal progression vehicle speed value to the control signal modification value when the vehicle speed failure input value is false; and
   computer readable code for assigning a value of 0.0 to the control signal modification value when the vehicle speed failure input value is true.

19. The computer readable medium of claim 11 wherein determining the control signal value comprises:
   computer readable code for determining a database based on a database identifier value;
   computer readable code for comparing the control signal modification value and an accelerator pedal signal input value to a database; and
   computer readable code for determining the control signal value based on the comparison.

20. The computer readable medium of claim 19 wherein the database comprises computer readable code implementing a lookup table comprising a control signal value for each combination of control signal modification and accelerator pedal signal input values.

* * * * *